(12) United States Patent
Hara et al.

(10) Patent No.: US 8,507,632 B2
(45) Date of Patent: *Aug. 13, 2013

(54) COMPOSITION CURABLE WITH ACTINIC ENERGY RAY AND USE THEREOF

(75) Inventors: Masahiro Hara, Aichi (JP); Tomihisa Ohno, Aichi (JP); Susumu Kawakami, Aichi (JP)

(73) Assignee: Natoco Co., Ltd. (JP)

( * ) Notice: Subject to any disclaimer, the term of this patent is extended or adjusted under 35 U.S.C. 154(b) by 921 days.

This patent is subject to a terminal disclaimer.

(21) Appl. No.: 11/530,680

(22) Filed: Sep. 11, 2006

(65) Prior Publication Data

US 2007/0049653 A1    Mar. 1, 2007

Related U.S. Application Data

(62) Division of application No. 10/503,206, filed as application No. PCT/JP03/01005 on Jan. 31, 2003, now abandoned.

(30) Foreign Application Priority Data

Feb. 1, 2002  (JP) .................................. 2002-26022
Dec. 20, 2002 (JP) ................................ 2002-370487

(51) Int. Cl.
  C08L 75/06 (2006.01)
  C08L 75/16 (2006.01)
  C08G 18/42 (2006.01)
  C08G 18/67 (2006.01)
  C08G 18/68 (2006.01)

(52) U.S. Cl.
  USPC .......... 528/49; 252/182.18; 522/90; 526/301; 528/75

(58) Field of Classification Search
  USPC .................. 528/49, 75; 522/90; 252/182.18; 526/301
  See application file for complete search history.

(56) References Cited

U.S. PATENT DOCUMENTS

| | | | |
|---|---|---|---|
| 4,131,602 A | 12/1978 | Hodakowski et al. | |
| 4,780,487 A | 10/1988 | Kurpiewski et al. | |
| 4,800,123 A | 1/1989 | Boeckeler | |
| 4,874,799 A | 10/1989 | Hung et al. | |
| 5,322,861 A | 6/1994 | Tsuge et al. | |
| 5,326,820 A | 7/1994 | Hoffmann et al. | |
| 5,843,576 A * | 12/1998 | Rosenberry et al. | 428/423.1 |
| 6,017,973 A | 1/2000 | Tamura et al. | |
| 6,075,065 A | 6/2000 | Yamazaki et al. | |
| 6,410,611 B1 | 6/2002 | Sakurai et al. | |
| 6,689,839 B1 | 2/2004 | Hayakawa et al. | |
| 6,825,243 B2 | 11/2004 | Ohno et al. | |
| 7,939,608 B2 * | 5/2011 | Hara et al. | 525/452 |
| 2008/0125550 A1 | 5/2008 | Hara et al. | |

FOREIGN PATENT DOCUMENTS

| | | |
|---|---|---|
| JP | 2274713 | 11/1990 |
| JP | 06-081822 | 4/1994 |
| JP | 6180628 | 6/1994 |
| JP | 11-228905 | 8/1999 |
| JP | 11-286531 | 10/1999 |
| JP | 2000249804 | 9/2000 |
| JP | 2001-002744 | 1/2001 |
| JP | 2001353817 | 12/2001 |
| JP | 2002-256053 | 9/2002 |
| JP | 2003-014906 | 1/2003 |

OTHER PUBLICATIONS

Sax et al.; Hawley's Condensed Chemical Dictionary, Eleventh Edition; Van Nostrand Reinhold; New York; 1987; pp. 246, 1091, and 1092.*

"Preparation of UV-curable urethane resins and their properties," Polymer Science and Technology, vol. 10, No. 5, pp. 629-639, with English summary, 12 pages, Oct. 1999.

* cited by examiner

*Primary Examiner* — Rabon Sergent
(74) *Attorney, Agent, or Firm* — Sheridan Ross P.C.

(57) ABSTRACT

An actinic energy ray curable composition useful as a paint or coating agent, especially for products where scratch resistance is desired, includes a particular composition that includes a urethane (meth)acrylate obtained by reacting to an organic isocyanate having a plurality of isocyanate groups in one molecule with a polycaprolactone-modified alkyl (meth)acrylate and a long-chain alcohol.

9 Claims, No Drawings

COMPOSITION CURABLE WITH ACTINIC ENERGY RAY AND USE THEREOF

CROSS REFERENCE TO RELATED APPLICATION

This is a divisional application of U.S. Ser. No. 10/503,206, filed Jul. 30, 2004, now abandoned. U.S. Ser. No. 10/503,206 (parent) is a national stage application under 35 U.S.C. 371 of PCT Application No. PCT/JP03/01005 having an international filing date of Jan. 31, 2003, which designated the United States, which PCT application claimed the benefit of Japanese Application Serial No. 2002-26022, filed Feb. 1, 2002, and Japanese Application Serial No. 2002-370487, filed Dec. 20, 2002, the entire disclosures of which are hereby incorporated herein by reference.

FIELD OF THE INVENTION

The present invention relates to an actinic energy ray-curable composition useful as paints or coating agents for products where scratch resistance is required.

DESCRIPTION OF RELATED ART

In Japanese Laid-Open Patent Publication No. 2001-2744, the present inventors have proposed an ultraviolet curable composition containing an ultraviolet curable urethane(meth)acrylate oligomer and a photoinitiator. The oligomer is obtained by reacting an isocyanate prepolymer compound having three or more isocyanate groups in one molecule with a polycaprolactone-modified hydroxyethyl(meth)acrylate.

In a cured product of the ultraviolet curable composition, scratches generated on the surface of the product can be repaired by self-repairing ability. Therefore, the cured product has scratch resistance. Accordingly, the ultraviolet curable composition is useful as paints or coating agents for products where scratch resistance is required.

However, the scratch resistance of the cured product is not necessarily satisfied in some applications. This limits the applications for the ultraviolet curable composition.

SUMMARY OF THE INVENTION

An object of the present invention is to provide an actinic energy ray-curable composition capable of forming a cured product having excellent scratch resistance.

In order to achieve the above-described object, in one embodiment of the present invention, the following actinic energy ray-curable composition is provided. In a cured product having a thickness of 60 μm obtained from the composition, when a scratch mark is made at a vertical load of 235 mN using a diamond indenter with a tip diameter of 15 μm, the scratch mark is repaired by self-repairing ability under an atmosphere at 25° C. and at a relative humidity of 50%.

In another embodiment of the present invention, the following actinic energy ray-curable composition is provided. The composition contains a urethane(meth)acrylate obtained by reacting an organic isocyanate having a plurality of isocyanate groups in one molecule with a polycaprolactone-modified alkyl(meth)acrylate. The urethane(meth)acrylate contains two or more kinds of urethane(meth)acrylates different from one another in a number of repetitions of a caprolactone unit per one residue of the polycaprolactone-modified alkyl(meth)acrylate.

In further another embodiment of the present invention, the following actinic energy ray-curable composition is provided. The composition contains a urethane(meth)acrylate obtained by reacting an organic isocyanate having a plurality of isocyanate groups in one molecule with two or more kinds of polycaprolactone-modified alkyl(meth)acrylates different from one another in a number of repetitions of a caprolactone unit per one molecule.

In a further another embodiment of the present invention, the following actinic energy ray-curable composition is provided. The composition contains a urethane(meth)acrylate obtained by reacting an organic isocyanate having a plurality of isocyanate groups in one molecule with a polycaprolactone-modified alkyl(meth)acrylate, and a urethane(meth)acrylate obtained by reacting an organic isocyanate having a plurality of isocyanate groups in one molecule with a hydroxyalkyl(meth)acrylate.

In further another embodiment of the present invention, the following actinic energy ray-curable composition is provided. The composition contains a urethane(meth)acrylate obtained by reacting an organic isocyanate having a plurality of isocyanate groups in one molecule with a polycaprolactone-modified alkyl(meth)acrylate and a hydroxyalkyl(meth)acrylate.

DETAILED DESCRIPTION OF THE PREFERRED EMBODIMENTS

First Embodiment

First, an actinic energy ray-curable composition according to a first embodiment of the present invention is described.

The actinic energy ray-curable composition according to the first embodiment contains two or more kinds of urethane(meth)acrylates different from one another in the number of repetitions of a caprolactone unit per one residue of a polycaprolactone-modified alkyl(meth)acrylate.

The average number of repetitions per one molecule of the urethane(meth)acrylate relative to the number of repetitions of the caprolactone unit per one residue of the polycaprolactone-modified alkyl(meth)acrylate is preferably in the range of from 1 to 5, more preferably in the range of from 1 to 2.5. The maximum difference in the number of repetitions of the caprolactone unit per one residue of the polycaprolactone-modified alkyl(meth)acrylate between two kinds of the urethane(meth)acrylates is preferably 9 or less, more preferably in the range of from 4 to 9.

Each of the urethane(meth)acrylates is synthesized by reacting an organic isocyanate with a polycaprolactone-modified alkyl(meth)acrylate. By mixing these urethane(meth)acrylates, the actinic energy ray-curable composition is prepared.

When reacting the organic isocyanate with the polycaprolactone-modified alkyl(meth)acrylate, the reaction temperature is preferably from an ordinary temperature to 100° C. and the reaction time is preferably from 1 to 10 hours.

The organic isocyanate is an organic compound having a plurality of isocyanate groups in one molecule. The number of isocyanate groups contained in one molecule of the organic isocyanate is preferably 3 or more.

Specific examples of the organic isocyanate having two isocyanate groups in one molecule include diisocyanate monomers such as tolylene diisocyanate, naphthalene diisocyanate, diphenylmethane diisocyanate, isophorone diisocyanate, xylylene diisocyanate, hexamethylene diisocyanate, dicyclohexylmethane diisocyanate, 2,2,4-trimethylhexamethylene diisocyanate, methyl-2,6-diisocyanato hexanoate and norbornane diisocyanate.

Specific examples of the organic isocyanate having three or more isocyanate groups in one molecule include isocyanate prepolymers such as a compound represented by the following general formula (1) obtained by subjecting a diisocyanate monomer to isocyanurate modification, a compound represented by the following general formula (2) obtained by subjecting a diisocyanate monomer to adduct modification, a compound represented by the following general formula (3) obtained by subjecting a diisocyanate monomer to biuret modification, 2-isocyanatoethyl-2,6-diisocyanatocaproate, and triaminononane triisocyanate.

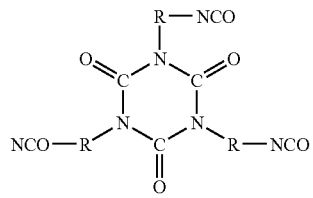
(1)

R represents

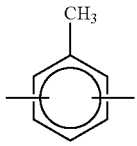

or

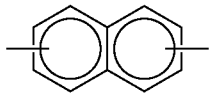

or

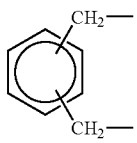

or —(CH$_2$)$_6$— or

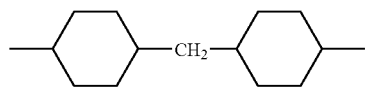

or

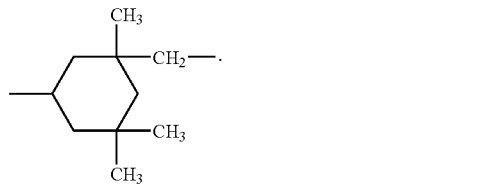

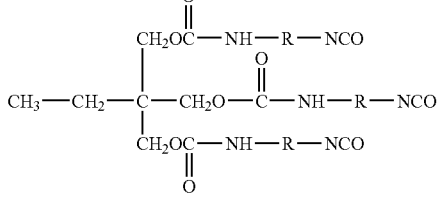
(2)

R has the same meaning as defined in the above general formula (1).

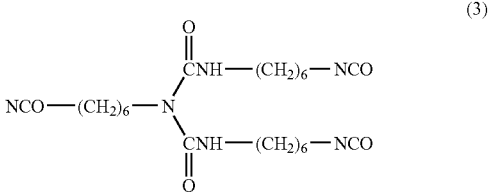
(3)

The polycaprolactone-modified alkyl(meth)acrylate is a compound represented by the following general formula (4) and has an actinic energy ray-curable functional group such as a terminal methylene group (CH$_2$=). Specific examples of the polycaprolactone-modified alkyl(meth)acrylate include a polycaprolactone-modified hydroxyethyl(meth)acrylate, a polycaprolactone-modified hydroxypropyl(meth)acrylate, and a polycaprolactone-modified hydroxybutyl(meth)acrylate.

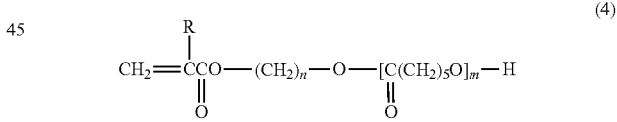
(4)

R represents H or CH$_3$, n is an integer of 1 to 10, and m is an integer of 1 to 25.

The actinic energy ray-curable composition can be used as paints and coating agents for products where scratch resistance is required. More specifically, the actinic energy ray-curable composition is applied (painted or coated) onto electrical or electronic apparatus such as cell phones, watches, compact disks, optical disks, audio equipment, and office automation equipment; electronic material parts such as touch panels, and antireflection board for cathode ray tubes; household electrical appliances such as refrigerators, vacuum cleaners, and microwave ovens; interior of automobiles such as meter panels and dashboards; pre-coated metal steel plates; vehicular parts such as automobile bodies, bumpers, spoilers, door knobs, steering wheels, head lamps, fuel tanks of motorcycles, plated, vapor-deposited, or sputtered aluminum wheels, and door mirrors; roofs of carports and roofs for natural lighting; molded products of plastics such as polyvinyl chloride, acrylic resin, polyethylene terephthalate, polycarbonate, and ABS resin; wood products such as stairs, floors, tables, chairs, chests, and other furniture; fabrics and paper; dark glasses and spectacle lenses for correction.

The actinic energy ray-curable composition is applied according to known methods such as air spraying, airless spraying, electrostatic coating, roll coater, flow coater, and spin coating. The thickness of the coated film is preferably from about 1 to 100 μm.

The actinic energy ray-curable composition is cured by irradiation with an actinic energy ray such as an ultraviolet ray and an electron beam. The irradiation with an ultraviolet ray is preferably conducted using a UV light source such as a mercury lamp and a metal halide lamp so that the curing energy (integral light intensity) becomes from 100 to 1000 mJ/cm$^2$. The irradiation with an electron beam is preferably conducted at an accelerating voltage of 150 to 250 keV so that the dose becomes from 1 to 5 Mrad.

Next, a functional member and an optical member according to the first embodiment are described.

When the cured product of the actinic energy ray-curable composition according to the first embodiment is molded into a predetermined shape or a cured layer made of the actinic energy ray-curable composition is provided on the surface of a substrate, the functional member and the optical member according to the first embodiment are formed. The cured layer itself may function as a functional member or an optical member or may be one for protecting a substrate functioning as a functional member or an optical member.

The functional member is a member having some kind of useful characteristic. Specific examples of the functional member include light reflective film, antireflection film, polarizing film, light diffusing film, phase contrast film, film for adjusting angle of visibility, heat reflective film, ultraviolet ray shielding film, electromagnetic wave shielding film, and film for touch sensors. The optical member is a member having a useful optical characteristic. Specific examples of the optical member include light reflective film, antireflection film, polarizing film, light diffusing film, phase contrast film, and film for adjusting angles of visibility.

During preparation of the functional member and the optical member, the actinic energy ray-curable composition is cured by irradiation with an actinic energy ray such as an ultraviolet ray and an electron beam. Preferable irradiation conditions for an actinic energy ray at this time are as described above.

The first embodiment has the following advantages.

(a) A maximum scratch load (vertical load) is defined as a critical load where when a scratch mark is made on a test specimen using a diamond indenter having a tip diameter of 15 μm, the scratch mark can be repaired by a self-repairing ability of the test specimen under an atmosphere at 25° C. and at a relative humidity of 50%. In the cured product of the actinic energy ray-curable composition according to the first embodiment, the value of the critical load is larger than that in a cured product of a conventional ultraviolet-curable composition. Specifically, the value of the critical load measured using the cured product (cured film) having a thickness of 60 μm formed from the actinic energy ray-curable composition according to the first embodiment is at least 235 mN (24 gf) or more, and optionally 390 mN (40 gf) or more. Since the cured product has excellent scratch resistance as described above, the actinic energy ray-curable composition according to the first embodiment is useful as paints or coating agents for products where scratch resistance is particularly strongly required.

(b) When the urethane(meth)acrylate is synthesized by reacting the organic compound having three or more isocyanate groups in one molecule with the polycaprolactone-modified alkyl(meth)acrylate, scratch resistance of the cured product of the actinic energy ray-curable composition is improved.

(c) When the average number of repetitions per one molecule of the urethane(meth)acrylate relative to the number of repetitions of the caprolactone unit per one residue of the polycaprolactone-modified alkyl(meth)acrylate is in a range of from 1 to 5, scratch resistance of the cured product of the actinic energy ray-curable composition is improved. When the average number is in a range of from 1 to 2.5, the effect thereof is further enhanced.

(d) When the maximum difference in the number of repetitions of the caprolactone unit per one residue of the polycaprolactone-modified alkyl(meth)acrylate between two kinds of the urethane(meth)acrylates is 9 or less, scratch resistance of the cured product of the actinic energy ray-curable composition is improved. When the maximum difference is in a range of from 4 to 9, the effect thereof is further enhanced.

Second Embodiment

Next, an actinic energy ray-curable composition according to a second embodiment is described mainly with respect to points differing from the actinic energy ray-curable composition according to the first embodiment.

The actinic energy ray-curable composition according to the second embodiment contains a urethane(meth)acrylate obtained by reacting an organic isocyanate with two or more kinds of polycaprolactone-modified alkyl(meth)acrylates different from each other in the number of repetitions of a caprolactone unit per one molecule.

The average of the number of repetitions of the caprolactone unit per one molecule of the polycaprolactone-modified alkyl(meth)acrylate is preferably in a range of from 1 to 5, more preferably in a range of from 1 to 2.5. The maximum difference in the number of repetitions of the caprolactone unit between two kinds of the polycaprolactone-modified alkyl(meth)acrylates is preferably 9 or less, more preferably in a range of from 4 to 9.

Next, a functional member and an optical member according to the second embodiment are described mainly with respect to points differing from the functional member and the optical member according to the first embodiment. When a cured product of the actinic energy ray-curable composition according to the second embodiment is molded into a predetermined shape or a cured layer made of the actinic energy ray-curable composition is provided on the surface of a substrate, a functional member and optical member according to the second embodiment are formed.

The second embodiment has the following advantages.

(e) The actinic energy ray-curable composition according to the second embodiment has the same advantages as in (a) and (b) described in the description of the first embodiment.

(f) When the average of the number of repetitions of the caprolactone unit per one molecule of the polycaprolactone-modified alkyl(meth)acrylate is in a range of from 1 to 5, scratch resistance of the cured product of the actinic energy ray-curable composition is improved. When the average is in a range of from 1 to 2.5, the effect thereof is further enhanced.

(g) When the maximum difference in the number of repetitions of the caprolactone unit between two kinds of the polycaprolactone-modified alkyl(meth)acrylates is 9 or less, scratch resistance of the cured product of the actinic energy ray-curable composition is improved. When the maximum difference is in a range of from 4 to 9, the effect thereof is further enhanced.

Third Embodiment

Next, an actinic energy ray-curable composition according to a third embodiment is described mainly with respect to points differing from the actinic energy ray-curable compositions according to the first and second embodiments.

The actinic energy ray-curable composition according to the third embodiment contains a urethane(meth)acrylate obtained by reacting an organic isocyanate with a polycaprolactone-modified alkyl(meth)acrylate, and a urethane(meth) acrylate obtained by reacting an organic isocyanate with a hydroxyalkyl(meth)acrylate.

Specific examples of the hydroxyalkyl(meth)acrylate include a compound represented by the following general formula (5) such as hydroxyethyl(meth)acrylate, hydroxypropyl(meth)acrylate, and hydroxybutyl(meth)acrylate.

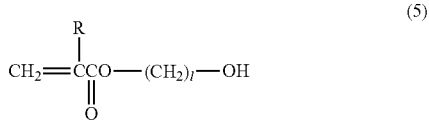

(5)

R represents H or $CH_3$ and l is an integer of 1 to 10.

When generically naming the polycaprolactone-modified alkyl(meth)acrylate and the hydroxyalkyl(meth)acrylate as a (meth)acrylate monomer, the hydroxyalkyl(meth)acrylate can be considered as a (meth)acrylate monomer where the number of repetitions of the caprolactone unit is zero.

The average number of repetitions per one molecule of the urethane(meth)acrylate relative to the number of repetitions of the caprolactone unit per one residue of the (meth)acrylate monomer is preferably in a range of from 1 to 5, more preferably in a range of from 1 to 2.5. The maximum difference in the number of repetitions of the caprolactone unit per one residue of the (meth)acrylate monomer between two kinds of the urethane(meth)acrylates is preferably 9 or less, more preferably in the range of from 4 to 9.

Next, a functional member and an optical member according to the third embodiment are described mainly with respect to points differing from the functional member and the optical member according to the first embodiment. When a cured product of the actinic energy ray-curable composition according to the third embodiment is molded into a predetermined shape or a cured layer made of the actinic energy ray-curable composition is provided on the surface of a substrate, the functional member and the optical member according to the third embodiment are formed.

The third embodiment has the following advantages.

(h) The actinic energy ray-curable composition according to the third embodiment has the same advantages as in (a), described above in the description of the first embodiment.

(i) When the urethane(meth)acrylate is synthesized by reacting the organic compound having three or more isocyanate groups in one molecule with the polycaprolactone-modified alkyl(meth)acrylate or the hydroxyalkyl(meth) acrylate, scratch resistance of the cured product of the actinic energy ray-curable composition is improved.

(j) When the average number of repetitions per one molecule of the urethane(meth)acrylate relative to the number of repetitions of the caprolactone unit per one residue of the (meth)acrylate monomer is in a range of from 1 to 5, scratch resistance of the cured product of the actinic energy ray-curable composition is improved. When the average is in a range of from 1 to 2.5, the effect thereof is further enhanced.

(k) When the maximum difference in the number of repetitions of the caprolactone unit per one residue of the (meth) acrylate monomer between two kinds of the urethane(meth) acrylates is 9 or less, scratch resistance of the cured product of the actinic energy ray-curable composition is improved. When the maximum difference is in a range of from 4 to 9, the effect thereof is further enhanced.

Fourth Embodiment

Next, an actinic energy ray-curable composition according to a fourth embodiment is described mainly with respect to points differing from the actinic energy ray-curable compositions according to the first to third embodiments.

An actinic energy ray-curable composition according to the fourth embodiment contains a urethane(meth)acrylate obtained by reacting an organic isocyanate with a polycaprolactone-modified alkyl(meth)acrylate and a hydroxyalkyl (meth)acrylate. In other words, the actinic energy ray-curable composition according to the fourth embodiment contains a urethane(meth)acrylate obtained by reacting an organic isocyanate with two or more kinds of (meth)acrylate monomers different from each other in the number of repetitions of a caprolactone unit per one molecule.

The average of the number of repetitions of the caprolactone unit per one molecule of the (meth)acrylate monomer is preferably in a range of from 1 to 5, more preferably in a range of from 1 to 2.5. The maximum difference in the number of repetitions of the caprolactone unit between two kinds of the (meth)acrylate monomers is preferably 9 or less, more preferably in a range of from 4 to 9.

Next, a functional member and an optical member according to the fourth embodiment are described mainly with respect to points differing from the functional member and the optical member according to the first embodiment. When a cured product of the actinic energy ray-curable composition according to the fourth embodiment is molded into a predetermined shape or a cured layer made of the actinic energy ray-curable composition is provided on the surface of a substrate, a functional member and an optical member according to the fourth embodiment are formed.

The fourth embodiment has the following advantages.

(l) The actinic energy ray-curable composition according to the fourth embodiment has the same advantages as in (a), described above in the description of the first embodiment.

(m) When the urethane(meth)acrylate is synthesized by reacting the organic compound having three or more isocyanate groups in one molecule with the polycaprolactone-modified alkyl(meth)acrylate and the hydroxyalkyl(meth) acrylate, scratch resistance of the cured product of the actinic energy ray-curable composition is improved.

(n) When the average of the number of repetitions of the caprolactone unit per one molecule of the (meth)acrylate monomer is in a range of from 1 to 5, scratch resistance of the cured product of the actinic energy ray-curable composition is improved. When the average is in a range of from 1 to 2.5, the effect thereof is further enhanced.

(o) When the maximum difference in the number of repetitions of the caprolactone unit between two kinds of the (meth)acrylate monomers is 9 or less, scratch resistance of the cured product of the actinic energy ray-curable composition is improved. When the maximum difference is in a range of from 4 to 9, the effect thereof is further enhanced.

The above-described embodiments may be changed as follows.

A synthesis reaction of the urethane(meth)acrylate may be performed in a solvent. Specific examples of the solvent include aromatic hydrocarbon solvents such as toluene and xylene; ketone solvents such as acetone, methyl ethyl ketone, methyl isobutyl ketone, and cyclohexanone; and ester solvents such as ethyl acetate, propyl acetate, isobutyl acetate, and butyl acetate.

In a synthesis reaction of the urethane(meth)acrylate, a catalyst or a polymerization inhibitor may be used. Specific examples of the catalyst include dibutyltin laurate, dibutyltin diethylhexoate, and dibutyltin sulfite. Specific examples of the polymerization inhibitor include hydroquinone monomethyl ether.

In a synthesis reaction system of the urethane(meth)acrylate, a long-chain alcohol may be added. The addition of the long-chain alcohol improves surface smoothness of the cured product of the actinic energy ray-curable composition, and as a result, it improves scratch resistance of the cured product.

Specific examples of the long-chain alcohol include tridecanol, myristyl alcohol, cetyl alcohol, stearyl alcohol, behenyl alcohol, polyoxyethylene monostearate, polyoxyethylene cetyl ether, polyoxyethylene stearyl ether, and glycerol monostearate. Preferable long-chain alcohol is a long-chain alcohol subjected to polyether modification, such as a polyether-modified cetyl alcohol. The addition of the long-chain alcohol subjected to polyether modification imparts an antistatic effect to the cured product made of the actinic energy ray-curable composition.

Each actinic energy ray-curable composition according to the embodiments described above may further contain any one of a long-chain alkyl group-containing compound, a silicone compound, and a fluorine compound. The long-chain alkyl group-containing compound, the silicone compound, and the fluorine compound improve surface smoothness of the cured product of the actinic energy ray-curable composition, and as a result, they improve scratch resistance of the cured product.

The long-chain alkyl group-containing compound, the silicone compound, and the fluorine compound each preferably have an actinic energy ray-curable functional group. The long-chain alkyl group-containing compound, the silicone compound, and the fluorine compound each having the actinic energy ray-curable functional group reduce the viscosity of the actinic energy ray-curable composition and make the composition highly solid. They further improve adhesion to a substrate and solvent resistance, in the cured product of the actinic energy ray-curable composition.

The number of carbon atoms of the long-chain alkyl group contained in the long-chain alkyl group-containing compound is preferably from 13 to 25. This is because the scratch resistance of the cured product made of the actinic energy ray-curable composition is further improved. Specific examples of the long-chain alkyl group-containing compound having 13 to 25 carbon atoms include a long-chain alcohol such as tridecanol, myristyl alcohol, cetyl alcohol, stearyl alcohol, behenyl alcohol, polyoxyethylene cetyl alcohol, polyoxyethylene stearyl alcohol, and glycerol monostearate; and an actinic energy ray-curable compound such as tridecyl(meth)acrylate, myristyl(meth)acrylate, cetyl(meth)acrylate, stearyl(meth)acrylate, behenyl(meth)acrylate, and stearoxypolyethylene glycol mono(meth)acrylate. The actinic energy ray-curable compound has an actinic energy ray-curable functional group.

Specific examples of the silicone compound include polydimethylsiloxane, alkyl-modified polydimethylsiloxane, carboxyl-modified polydimethylsiloxane, amino-modified polydimethylsiloxane, epoxy-modified polydimethylsiloxane, fluorine-modified polydimethylsiloxane, and (meth)acrylate-modified polydimethylsiloxane (e.g., "GUV-235", trade name, produced by Toagosei Co., Ltd.).

Specific examples of the fluorine compound include compounds having a fluoroalkyl group such as fluoroalkyl carboxylate, fluoroalkyl quaternary ammonium salt, and fluoroalkyl ethylene oxide adduct; compounds having a perfluoroalkyl group such as perfluoroalkyl carboxylate, perfluoroalkyl quaternary ammonium salt, and perfluoroalkyl ethylene oxide adduct; compounds having a fluorocarbon group; tetrafluoroethylene polymers; copolymers of vinylidene fluoride with tetrafluoroethylene; copolymers of vinylidene fluoride with hexafluoropropylene; fluorine-containing (meth)acrylic acid ester; polymers of fluorine-containing (meth)acrylic acid ester; polymers of fluorine-containing alkyl(meth)acrylate; and copolymers of fluorine-containing (meth)acrylic acid ester with other monomer. Specific examples of the fluorine-containing (meth)acrylic acid ester include 3-perfluorohexyl-2-hydroxypropyl=2,2-bis((meth)acryloyloxymethyl)propionate, 3-perfluorohexyl-2-((meth)acryloyloxy)propyl=2-((meth)acryloyloxymethyl)-2-(hydroxymethyl)propionate, 3-perfluorooctyl-2-hydroxypropyl=2,2-bis((meth)acryloyloxymethyl)propionate, 3-perfluorooctyl-2-((meth)acryloyloxy)propyl=2-((meth)acryloyloxymethyl)-2-(hydroxymethyl)propionate, 2-perfluorohexyl-(1-hydroxymethyl)ethyl=2,2-bis((meth)acryloyloxymethyl)propionate, 2-perfluorohexyl-1-((meth)acryloyloxymethyl ethyl=2-((meth)acryloyloxymethyl)-2-(hydroxymethyl)propionate, 2-perfluorooctyl-(1-hydroxymethyl)ethyl=2,2-bis((meth)acryloyloxymethyl)propionate, 2-perfluorooctyl-1-((meth)acryloyloxymethyl)ethyl=2-((meth)acryloyloxymethyl)-2-(hydroxymethyl)propionate, 3-perfluorobutyl-2-(meth)acryloyloxypropyl=2,2-bis((meth)acryloyloxymethyl)propionate, 3-perfluorohexyl-2-(meth)acryloyloxypropyl=2,2-bis((meth)acryloyloxymethyl)propionate, 3-perfluorooctyl-2-(meth)acryloyloxypropyl=2,2-bis((meth)acryloyloxymethyl)propionate, 3-perfluorocyclopentylmethyl-2-(meth)acryloyloxypropyl=2,2-bis((meth)acryloyloxymethyl)propionate, 3-perfluorocyclohexylmethyl-2-(meth)acryloyloxypropyl=2,2-bis((meth)acryloyloxymethyl)propionate, 3-perfluorocycloheptylmethyl-2-(meth)acryloyloxypropyl=2,2-bis((meth)acryloyloxymethyl)propionate, 2-perfluorobutyl-(1-(meth)acryloyloxymethyl)ethyl=2,2-bis((meth)acryloyloxymethyl)propionate, 2-perfluorohexyl-(1-(meth)acryloyloxymethyl)ethyl=2,2-bis((meth)acryloyloxymethyl)propionate, 2-perfluorooctyl-(1-(meth)acryloyloxymethyl)ethyl=2,2-bis((meth)acryloyloxymethyl)propionate, 2-perfluorocyclopentylmethyl-(1-(meth)acryloyloxymethyl)ethyl=2,2-bis((meth)acryloyloxymethyl)propionate, perfluorooctylethyl(meth)acrylate, 2-perfluorocyclohexylmethyl-(1-(meth)acryloyloxymethyl)ethyl=2,2-bis((meth)acryloyloxymethyl)propionate, 2-perfluorocycloheptylmethyl-(1-(meth)acryloyloxymethyl)ethyl=2,2-bis((meth)acryloyloxymethyl)propionate, (meth)acrylic acid-2,2,2-trifluoroethyl, (meth)acrylic acid-2,2,3,3,3-pentafluoropropyl, (meth)acrylic acid-2,2,3,3,4,4,4-heptafluorobutyl, (meth)acrylic acid-2,2,3,3,4,4,5,5,5-nonafluoropentyl, (meth)acrylic acid-2,2,3,3,4,4,5,5,6,6,6-undecafluorohexyl, (meth)acrylic acid-2,2,3,3,4,4,5,5,6,6,7,7,7-tridecafluoroheptyl, (meth)acrylic acid-2,2,3,3,4,4,5,5,6, 6,7,7,8,8,8-pentadecafluorooctyl, (meth)acrylic acid-3,3,4,4,5,5,6,6,7,7,8,8,8-tridecafluorooctyl, (meth)acrylic acid-2,2,3,3,4,4,5,5,6,6,7,7,8,8,9,9,10,10,10-nonadecafluorodecyl, (meth)acrylic acid-3,3,4,4,5,5,6,6,7,7,8,8,9,9,10,10,10-heptadecafluorodecyl, (meth)acrylic acid-2-trifluoromethyl-3,3,3-trifluoropropyl, (meth)acrylic acid-3-trifluoromethyl-4,4,4-trifluorobutyl, (meth)acrylic acid-1-methyl-2,2,3,3,3-pentafluoropropyl, (meth)acrylic acid-1-methyl-2,2,3,3,3,4,4,4-heptafluorobutyl, di(meth)acrylic acid-2,2,2-trifluoroethyl ethylene glycol, di(meth)acrylic acid-2,2,3,3,3-pentafluoropropyl ethylene glycol, di(meth)acrylic acid-2,2,3,3,4,4,4-heptafluorobutyl ethylene glycol, di(meth) acrylic acid-2,2,3,3,4,4,5,5,5-nonafluoropentylethylene glycol, di(meth)acrylic acid-2,2,3,3,4,4,5,5,6,6,6-undecafluorohexyl ethylene glycol, di(meth)acrylic acid-2,2,3,3,4,4,5,5,6,6,7,7,7-tridecafluoroheptylethylene glycol, di(meth)acrylic acid-2,2,3,3,4,4,5,5,6,6,7,7,8,8,8-pentadecafluorooctyl ethylene glycol, di(meth)acrylic acid-2,2,3,3,4,4,5,5,6,6,7,7,8,8,9,9,10,10,10-nonadecafluorodecyl ethylene glycol, di(meth)acrylic acid-2,2,3,3-tetrafluorobutanediol, di(meth)acrylic acid-2,2,3,3,4,4-hexafluoropentadiol, di(meth)acrylic acid-2,2,3,3,4,4,5,5-octafluorohexanediol, di(meth)acrylic acid-2,2,3,3,4,4,5,5,6,6-decafluoroheptanediol, di(meth)acrylic acid-2,2,3,3,4,4,5,5,6,6,7,7-dodecafluorooctanediol, di(meth)acrylic acid-2,2,3,3,4,4,5,5,6,6,7,7,8,8-tetradecafluorononanediol, di(meth)acrylic acid-2,2,3,3,4,4,5,5,6,6,7,7,8,8,9,9-hexadecafluorodecanediol, di(meth)acrylic acid-2,2,3,3,4,4,5,5,6,6,7,7,8,8,9,9,10,10-octadecafluoroundecanediol and di(meth)acrylic acid-2,2,3,3,4,4,5,5,6,6,7,7,8,8,9,9,10,10,11,11-eicosafluorododecanediol.

Each actinic energy ray-curable composition according to the embodiments described above may further contain an actinic energy ray-curable functional group-containing compound. The actinic energy ray-curable functional group-containing compound reduces the viscosity of the actinic energy ray-curable composition and makes the composition highly solid. The compound further improves adhesion to a substrate and solvent resistance, in the cured product made of the actinic energy ray-curable composition.

Specific examples of the actinic energy ray-curable functional group-containing compound include monofunctional and polyfunctional monomers each having a (meth)acryloyl group, and monofunctional and polyfunctional oligomers each having a (meth)acryloyl group. More specifically, examples thereof include monofunctional monomers such as phthalic acid monohydroxyethyl(meth)acrylate, 2-ethoxyhexyl(meth)acrylate, phenoxyethyl(meth)acrylate, 2-ethoxyethyl(meth)acrylate, 2-ethoxyethoxyethyl(meth)acrylate, 2-hydroxyethyl(meth)acrylate, 2-hydroxypropyl(meth)acrylate, polycaprolactone-modified hydroxyethyl(meth)acrylate, dicyclopentenyloxyethyl(meth)acrylate, N-vinylpyrrolidone, acryloylmorpholine, isobornyl(meth)acrylate, vinyl acetate, and styrene; difunctional monomers such as neopentyl glycol di(meth)acrylate, 1,9-nonanediol di(meth)acrylate, 1,6-hexanediol di(meth)acrylate, 1,4-butanediol di(meth)acrylate, diethylene glycol di(meth)acrylate, triethylene glycol di(meth)acrylate, tetraethylene glycol di(meth)acrylate, propylene glycol di(meth)acrylate, and dipropylene glycol di(meth)acrylate; polyfunctional monomers such as trimethylolpropane tri(meth)acrylate, pentaerythritol tri(meth)acrylate, tri(meth)acrylate of 3 mol propylene oxide adduct of trimethylolpropane, tri(meth)acrylate of 6 mol ethylene oxide adduct of trimethylolpropane, glycerolpropoxy tri(meth)acrylate, dipentaerythritol hexa(meth)acrylate, and hexa(meth)acrylate of caprolactone adduct of dipentaerythritol; and oligomers such as unsaturated polyesters, polyester (meth)acrylates, polyether(meth)acrylates, acryl(meth)acrylates, urethane(meth)acrylates, and epoxy(meth)acrylates.

Specific examples of the actinic energy ray-curable functional group-containing compound further include phenylphenolethoxy(meth)acrylate, phenylphenoldiethoxy(meth)acrylate, phenylphenolpentaethoxy(meth)acrylate, 1,3-bis[2-methacryloyloxy-3-(2,4,6-tribromophenoxy)propoxy]benzene, bisphenoxyethanolfluorene di(meth)acrylate, urethane(meth)acrylate having fluorene skeleton and (meth)acrylate of ε-caprolactone adduct having fluorene skeleton; and sulfur-containing (meth)acrylate such as 4,4'-bis(4-hydroxyphenyl)sulfone di(meth)acrylate, 4,4'-bis(4-hydroxyethoxyphenyl)sulfone di(meth)acrylate, 2,5-diacryloyloxy-1,4-dithiane, bis-2-(meth)acryloylthioethyl sulfide, 1,4-(meth)acryloylthiobenzene, 4,4'-bis[2-(meth)acryloyloxy]phenyl sulfide, 4,4'-bis[2-(meth)acryloyloxyethoxy]phenyl sulfide, 4,4'-bis[2-(meth)acryloyloxypropoxy]phenyl sulfide, 4,4'-bis[2-(meth)acryloyloxyethoxy]phenyl sulfone, 4,4'-bis[2-(meth)acryloyloxypropoxy]phenyl sulfone, di(meth)acrylate of 4,4'-dihydroxyphenylsulfide-ethylene oxide or propylene oxide adduct, phenylthioethyl(meth)acrylate [for example, "BX-PTEA" (phenylthioethyl acrylate) produced by BIMAX CHEMICALS LTD.], 1,3-bis[2-(meth)acryloyl-3-(1,3-dithiolan-2-yl)ethylthiopropoxy]benzene, 2-phenyl-4-acryloylthiomethyl-1,3-dithiolane and 4,4'-di(β-methacryloyloxyethylthio)diphenylsulfone, 2,5-bis(acryloyloxyethylthiomethyl)-1,4-dithiane, and 1,4-bis(2-methacryloyloxyethylthio)xylylene. These compounds improve the refractive index of the cured product of the actinic energy ray-curable composition.

Each actinic energy ray-curable composition according to the embodiments described above may further contain a photoinitiator. The photoinitiator improves curing characteristics of the actinic energy ray-curable composition such as acceleration of cure rate. Specific examples of the photoinitiator include isopropylbenzoin ether, isobutylbenzoin ether, benzophenone, Michler's ketone, o-benzoylmethyl benzoate, acetophenone, 2,4-diethylthioxanthone, 2-chlorothioxanthone, ethylanthraquinone, p-dimethylaminobenzoic acid isoamyl ester, p-dimethylaminobenzoic acid ethyl ester, 1-hydroxycyclohexyl phenyl ketone (for example, "Irgacure 184" produced by Ciba Specialty Chemicals Inc.), 2-hydroxy-2-methyl-1-phenyl-propan-1-on (for example, "Darocure 1173" produced by Ciba Specialty Chemicals Inc.), 2,2-dimethoxy-1,2-dephenylethan-1-on (for example, "Irgacure 651" produced by Ciba Specialty Chemicals Inc.), 2-benzyl-2-dimethylamino-1(4-morpholinophenyl)-butanone-1, bis(2,4,6-trimethylbenzoyl)-phenylphosphine oxide, and methylbenzyl formate.

Each actinic energy ray-curable composition according to the embodiments described above may further contain beads. The beads impart an antireflection effect to the cured product of the actinic energy ray-curable composition. Specific examples of the beads include beads each made of a synthetic resin such as polymethyl methacrylate, nylon, polyurethane, silicone, or polycarbonate, or a rubber; beads each made of a metal such as titanium oxide, titanium dioxide, aluminum oxide, tin oxide, indium oxide, zinc oxide, antimony oxide, antimony-containing tin oxide, or tin-containing indium oxide; and beads each made of silicon dioxide or glass.

Each actinic energy ray-curable composition according to the embodiments described above may further contain an antistatic agent. The antistatic agent imparts an antistatic effect to the cured product of the actinic energy ray-curable composition. Specific examples of the antistatic agent include anionic antistatic agents such as alkyl phosphates, cationic antistatic agents such as quaternary ammonium salts, nonionic antistatic agents such as polyoxyethylene alkyl ethers, and antistatic agents containing salts of an alkali metal such as lithium, sodium, or potassium. A preferable antistatic agent is one containing a lithium salt.

Each actinic energy ray-curable composition according to the embodiments described above may further contain a solvent, a leveling agent, or an ultraviolet absorber. Specific examples of the solvent include aromatic hydrocarbon solvents such as toluene and xylene; alcohol solvents such as methanol, ethanol, isopropyl alcohol, n-butanol, and isobutanol; ketone solvents such as acetone, methyl ethyl ketone, methyl isobutyl ketone, and cyclohexanone; ester solvents such as ethyl acetate, propyl acetate, butyl acetate, and isobutyl acetate. Specific examples of the leveling agent include acrylic copolymers and silicone leveling agents and fluorine leveling agents. Specific examples of the ultraviolet absorber include benzophenone-based, benzotriazole-based, oxalic anilide-based, triazine-based, and hindered amine-based ultraviolet absorbers.

EXAMPLES

Next, the present invention is described in greater detail by referring to Examples and Comparative Examples. "Part(s)" means "part(s) by weight".

Synthesis Example 1

50 parts of toluene, 50 parts of hexamethylene diisocyanate subjected to isocyanurate modification ("TAKENATE D-170N", trade name, produced by Takeda Chemical Industries, Ltd., isocyanate content: 20.9%), 63 parts of polycaprolactone-modified hydroxyethyl acrylate ("PLACCEL FA1", trade name, produced by Daicel Chemical Industries, Ltd.), 0.02 parts of dibutyltin laurate, and 0.02 parts of hydroquinone monomethyl ether were mixed and the mixture was maintained at 70° C. for 5 hours. Thereafter, 63 parts of toluene was added to the mixture to obtain a urethane acrylate having a solid content of 50% by weight. The number of repetitions of a caprolactone unit per one residue of the acrylate monomer in the obtained urethane acrylate is 1.

Synthesis Example 2

50 parts of toluene, 50 parts of hexamethylene diisocyanate subjected to biuret modification ("DURANATE 24A-90CX", trade name, produced by Asahi Kasei Corporation, N.V.:), nonvolatile content: 90%, isocyanate content: 21.2%], 92 parts of polycaprolactone-modified hydroxyethyl acrylate ("PLACCEL FA2D", trade name, produced by Daicel Chemical Industries, Ltd.), 0.02 parts of dibutyltin laurate, and 0.02 parts of hydroquinone monomethyl ether were mixed and the mixture was maintained at 70° C. for 5 hours. Thereafter, 82 parts of toluene was added to obtain a urethane acrylate having a solid content of 50% by weight. The number of repetitions of a caprolactone unit per one residue of the acrylate monomer in the obtained urethane acrylate is 2.

Synthesis Example 3

Into 50 parts of toluene, 4.2 parts of stearyl alcohol ("NAA-46", trade name, produced by NOF Corporation, hydroxyl value: 207) was added and the mixture was heated up to 40° C. After thorough dissolution of stearyl alcohol, 50 parts of hexamethylene diisocyanate subjected to isocyanurate modification ("TAKENATE D-170N") was added and the mixture was maintained at 70° C. for 30 minutes. Subsequently, 0.02 parts of dibutyltin laurate was added and the mixture was maintained at 70° C. for 3 hours. Further, 114 parts of polycaprolactone-modified hydroxyethyl acrylate ("PLACCEL FA3", trade name, produced by Daicel Chemical Industries, Ltd.), 0.02 parts of dibutyltin laurate and 0.02 parts of hydroquinone monomethyl ether were added and the mixture was maintained at 70° C. for 3 hours. Thereafter, 118.2 parts of toluene was added to obtain a urethane acrylate having a solid content of 50% by weight. The number of repetitions of a caprolactone unit per one residue of the acrylate monomer in the obtained urethane acrylate is 3.

Synthesis Example 4

50 parts of toluene, 50 parts of hexamethylene diisocyanate subjected to isocyanurate modification ("TAKENATE D-170N"), 179 parts of polycaprolactone-modified hydroxyethyl acrylate ("PLACCEL FA5", trade name, produced by Daicel Chemical Industries, Ltd.), 0.02 parts of dibutyltin laurate, and 0.02 parts of hydroquinone monomethyl ether were mixed and the mixture was maintained at 70° C. for 5 hours. Thereafter, 179 parts of toluene was added to obtain a urethane acrylate having a solid content of 50% by weight. The number of repetitions of a caprolactone unit per one residue of the acrylate monomer in the obtained urethane acrylate is 5.

Synthesis Example 5

50 parts of toluene, 25 parts of hexamethylene diisocyanate subjected to isocyanurate modification ("TAKENATE D-170N"), 162.8 parts of polycaprolactone-modified hydroxyethyl acrylate ("PLACCEL FA10", trade name, produced by Daicel Chemical Industries, Ltd.), 0.02 parts of dibutyltin laurate, and 0.02 parts of hydroquinone monomethyl ether were mixed and the mixture was maintained at 70° C. for 5 hours. Thereafter, 137.8 parts of toluene was added to obtain a urethane acrylate having a solid content of 50% by weight. The number of repetitions of a caprolactone unit per one residue of the acrylate monomer in the obtained urethane acrylate is 10.

Synthesis Example 6

25 parts of toluene, 25 parts of hexamethylene diisocyanate subjected to isocyanurate modification ("TAKENATE D-170N"), 32 parts of 2-hydroxyethyl acrylate ("LIGHT ESTER HOA", trade name, produced by KYOEISHA CHEMICAL Co., LTD), 0.02 parts of dibutyltin laurate, and 0.02 parts of hydroquinone monomethyl ether were mixed and the mixture was maintained at 70° C. for 5 hours. Thereafter, 32 parts of toluene was added to obtain a urethane acrylate having a solid content of 50% by weight. The number of repetitions of a caprolactone unit per one residue of the acrylate monomer in the obtained urethane acrylate is 0.

Synthesis Example 7

Into 60 parts of toluene, 10.3 parts of polyether-modified cetyl alcohol ("NONION P-208", trade name, produced by NOF Corporation, hydroxyl value: 95) was added and the mixture was heated up to 40° C. After thorough dissolution of the polyether-modified cetyl alcohol, 50 parts of hexamethylene diisocyanate subjected to isocyanurate modification ("TAKENATE D-170N") was added and the mixture was maintained at 70° C. for 30 minutes. Subsequently, 0.02 parts of dibutyltin laurate was added and the mixture was maintained at 70° C. for 3 hours. Further, 55.9 parts of polycaprolactone-modified hydroxyethyl acrylate ("PLACCEL FA1"), 0.02 parts of dibutyltin laurate and 0.02 parts of hydroquinone monomethyl ether were added and the mixture was maintained at 70° C. for 3 hours. Thereafter, 56.2 parts of toluene was added to obtain a urethane acrylate having a solid content of 50% by weight. The number of repetitions of a caprolactone unit per one residue of the acrylate monomer in the obtained urethane acrylate is 1.

Synthesis Example 8

50 parts of toluene, 50 parts of hexamethylene diisocyanate subjected to isocyanurate modification ("TAKENATE D-170N"), 47 parts of polycaprolactone-modified hydroxyethyl acrylate ("PLACCEL FA1"), 31 parts of polycaprolactone-modified hydroxyethyl acrylate ("PLACCEL FA3"), 0.02 parts of dibutyltin laurate, and 0.02 parts of hydroquinone monomethyl ether were mixed and the mixture was maintained at 70° C. for 5 hours. Thereafter, 78 parts of toluene was added to obtain a urethane acrylate having a solid content of 50% by weight. The average number of repetitions per one molecule of the urethane acrylate relative to the number of repetitions of a caprolactone unit per one residue of an acrylate monomer is 1.5. Further, the maximum difference in the number of repetitions between two kinds of the urethane acrylates is 2.

Synthesis Example 9

50 parts of toluene, 50 parts of hexamethylene diisocyanate subjected to isocyanurate modification ("TAKENATE D-170N"), 55 parts of polycaprolactone-modified hydroxyethyl acrylate ("PLACCEL FA1"), 24 parts of polycaprolactone-modified hydroxyethyl acrylate ("PLACCEL FA5"), 0.02 parts of dibutyltin laurate, and 0.02 parts of hydroquinone monomethyl ether were mixed and the mixture was maintained at 70° C. for 5 hours. Thereafter, 79 parts of toluene was added to obtain a urethane acrylate having a solid content of 50% by weight. The average number of repetitions per one molecule of the urethane acrylate relative to the number of repetitions of a caprolactone unit per one residue of an acrylate monomer is 1.5. Further, the maximum difference in the number of repetitions between two kinds of the urethane acrylates is 4.

Synthesis Example 10

25 parts of toluene, 50 parts of hexamethylene diisocyanate subjected to trimethylolpropane adduct modification ("BURNOCK DN-950", trade name, produced by Dainippon Ink and Chemicals, Incorporated, nonvolatile content: 75%, isocyanate content: 12%], 13.3 parts of 2-hydroxyethyl acrylate ("Light Ester HOA"), 35.9 parts of polycaprolactone-modified hydroxyethyl acrylate ("PLACCEL FA10"), 0.02 parts of dibutyltin laurate, and 0.02 parts of hydroquinone monomethyl ether were mixed and the mixture was maintained at 70° C. for 5 hours. Thereafter, 49.2 parts of toluene was added to obtain a urethane acrylate having a solid content of 50% by weight. The average number of repetitions per one molecule of the urethane acrylate relative to the number of repetitions of a caprolactone unit per one residue of an acrylate monomer is 2. Further, the maximum difference in the number of repetitions between two kinds of the urethane acrylates is 10.

Synthesis Example 11

Into 50 parts of toluene, 5.8 parts of behenyl alcohol ("NAA-422", trade name, produced by NOF Corporation, hydroxyl value: 180) was added and the mixture was heated up to 40° C. After thorough dissolution of the behenyl alcohol, 50 parts of hexamethylene diisocyanate subjected to isocyanurate modification ("TAKENATE D-170N") was added and the mixture was maintained at 70° C. for 30 minutes. Subsequently, 0.02 parts of dibutyltin laurate was added and the mixture was maintained at 70° C. for 3 hours. Further, 2.8 parts of 2-hydroxyethyl acrylate (Light Ester HOA), 36.1 parts of polycaprolactone-modified hydroxyethyl acrylate ("PLACCEL FA1"), 48.1 parts of polycaprolactone-modified hydroxyethyl acrylate ("PLACCEL FA5"), 0.02 parts of dibutyltin laurate and 0.02 parts of hydroquinone monomethyl ether were added and the mixture was maintained at 70° C. for 5 hours. Thereafter, 92.8 parts of toluene was added to obtain a urethane acrylate having a solid content of 50% by weight. The average number of repetitions per one molecule of the urethane acrylate relative to the number of repetitions of a caprolactone unit per one residue of an acrylate monomer is 2. Further, the maximum difference in the number of repetitions between two kinds of the urethane acrylates is 5.

Synthesis Example 12

50 parts of toluene, 87 parts of isophorone diisocyanate subjected to isocyanurate modification ("BESTANATE T1890E", trade name, produced by Degussa AG), nonvolatile content: 70%, isocyanate content: 12%], 59.8 parts of polycaprolactone-modified hydroxyethyl acrylate ("PLACCEL FA1"), 32.8 parts of polycaprolactone-modified hydroxyethyl acrylate ("PLACCEL FA20", trade name, produced by Daicel Chemical Industries, Ltd.), 0.02 parts of dibutyltin laurate, and 0.02 parts of hydroquinone monomethyl ether were mixed and the mixture was maintained at 70° C. for 5 hours. Thereafter, 84.5 parts of toluene was added to obtain a urethane acrylate having a solid content of 50% by weight. The average number of repetitions per one molecule of the urethane acrylate relative to the number of repetitions of a caprolactone unit per one residue of an acrylate monomer is 2. Further, the maximum difference in the number of repetitions between two kinds of the urethane acrylates is 19.

The number of repetitions of the caprolactone unit per one molecule of the acrylate monomer and the hydroxyl value used in Synthesis Examples 1 to 12 are shown in Table 1.

TABLE 1

| | Acrylate monomer | | | | | | |
|---|---|---|---|---|---|---|---|
| | HEA | FA1 | FA2D | FA3 | FA5 | FA10 | FA20 |
| Number of repetitions of caprolactone unit per one molecule of acrylate monomer | 0 | 1 | 2 | 3 | 5 | 10 | 20 |
| Hydroxyl value | 484 | 244 | 163 | 122 | 82 | 45 | 23 |

Example 1

60 parts of the urethane acrylate obtained in Synthesis Example 1, 20 parts of the urethane acrylate obtained in Synthesis Example 3, 10 parts of phthalic acid monohydroxyethyl acrylate ("M-5400", trade name, produced by Toagosei Co., Ltd.), 10 parts of toluene, and 3 parts of a photoinitiator ("IRGACURE 184", trade name, produced by CIBA SPECIALTY CHEMICALS) were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 1.5. Further, the difference in the number of repetitions between two kinds of the urethane acrylates contained in this actinic energy ray-curable composition is 2.

Example 2

73 parts of the urethane acrylate obtained in Synthesis Example 1, 27 parts of the urethane acrylate obtained in Synthesis Example 4, 0.5 parts of a silicone compound having an actinic energy ray-curable functional group ("BYK-371", trade name, produced by BYK K.K.), and 3 parts of a photoinitiator ("IRGACURE 184") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 1.8. Further, the difference in the number of repetitions between two kinds of the urethane acrylates contained in the actinic energy ray-curable composition is 4.

Example 3

90 parts of the urethane acrylate obtained in Synthesis Example 7, 10 parts of the urethane acrylate obtained in Synthesis Example 5, and 3 parts of a photoinitiator ("IRGACURE 184") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 2. Further, the difference in the number of repetitions between two kinds of the urethane acrylates contained in this actinic energy ray-curable composition is 9.

Example 4

63 parts of the urethane acrylate obtained in Synthesis Example 6, 27 parts of the urethane acrylate obtained in Synthesis Example 4, 5 parts of phthalic acid monohydroxyethyl acrylate ("M-5400"), 0.1 parts of a fluorine compound having an actinic energy ray-curable functional group ("NS-2104", trade name, produced by Daikin Industries, Ltd.), 5 parts of toluene, and 3 parts of a photoinitiator ("IRGACURE 184") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 1.5. Further, the difference in the number of repetitions between two kinds of the urethane acrylates contained in the actinic energy ray-curable composition is 5.

Example 5

80 parts of the urethane acrylate obtained in Synthesis Example 8, 10 parts of phthalic acid monohydroxyethyl acrylate ("M-5400"), 10 parts of toluene, and 3 parts of a photoinitiator ("IRGACURE 184") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 1.5. Further, the maximum difference in the number of repetitions between urethane acrylates contained in the actinic energy ray-curable composition is 2.

Example 6

80 parts of the urethane acrylate obtained in Synthesis Example 9, 10 parts of tetraethylene glycol diacrylate ("LIGHT-ACRYLATE 4EG-A", trade name, produced by Kyoeisha Chemical Co., Ltd.), 0.3 parts of polyether-modified stearyl alcohol ("S-2", trade name, produced by NOF Corporation), 10 parts of toluene, and 3 parts of a photoinitiator ("IRGACURE" 184) were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 1.5. Further, the maximum difference in the number of repetitions between urethane acrylates contained in this actinic energy ray-curable composition is 4.

Example 7

100 parts of the urethane acrylate obtained in Synthesis Example 10, 1 part of a fluorine compound having an actinic energy ray-curable functional group ("NS-2103", trade name, produced by Daikin Industries, Ltd.), and 3 parts of a photoinitiator ("IRGACURE 184") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 2.0. Further, the maximum difference in the number of repetitions between urethane acrylates contained in this actinic energy ray-curable composition is 10.

Example 8

90 parts of the urethane acrylate obtained in Synthesis Example 11, 5 parts of phthalic acid monohydroxyethyl acrylate ("M-5400"), 5 parts of toluene, and 3 parts of a photoinitiator ("IRGACURE 184") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 2.0. Further, the maximum difference in the number of repetitions between urethane acrylates contained in this actinic energy ray-curable composition is 5.

Example 9

70 parts of the urethane acrylate obtained in Synthesis Example 12, 15 parts of the triethylene glycol diacrylate, ("3EG-A", trade name, produced by Kyoeisha Chemical Co., Ltd.), 15 parts of toluene, and 3 parts of a photoinitiator ("IRGACURE 184") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 2. Further, the maximum difference in the number of repetitions between urethane acrylates contained in this actinic energy ray-curable composition is 19.

Example 10

4 parts of the urethane acrylate obtained in Synthesis Example 1, 46 parts of the urethane acrylate obtained in Synthesis Example 4, 15 parts of bisphenoxy ethanol fluorene diacrylate ("BPEF-A", trade name, produced by Osaka Gas Chemical Co., Ltd.), 10 parts of polyethylene glycol diacrylate ("LIGHT-ACRYLATE 14EGA", trade name, produced by Kyoeisha Chemical Co., Ltd.), 25 parts of toluene, and 3 parts of a photoinitiator ("IRGACURE 2959") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 4.5. Further, the maximum difference in the number of repetitions between urethane acrylates contained in this actinic energy ray-curable composition is 4.

Comparative Example 1

Into 100 parts of the urethane acrylate obtained in Synthesis Example 2, 3 parts of a photoinitiator ("IRGACURE 184") was mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is 2.

Comparative Example 2

Into 100 parts of the urethane acrylate obtained in Synthesis Example 6, 3 parts of a photoinitiator ("IRGACURE 184") was mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is zero.

Comparative Example 3

35 parts of urethane acrylate ("M-1100", trade name, produced by Toagosei Co., Ltd.), 65 parts of polycaprolactone-modified hydroxyethyl acrylate ("PLACCEL FA2D"), 100 parts of toluene, and 6 parts of a photoinitiator ("IRGACURE 184") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is zero.

Comparative Example 4

68 parts of urethane acrylate ("M-1200", trade name, produced by Toagosei Co., Ltd.), 32 parts of polycaprolactone-modified hydroxyethyl acrylate ("PLACCEL FA5"), 100 parts of toluene, and 6 parts of a photoinitiator ("IRGACURE 184") were mixed to prepare an actinic energy ray-curable composition having a solid content of 50% by weight. The average number of repetitions per one molecule of the urethane acrylate contained in the actinic energy ray-curable composition, relative to the number of repetitions of a caprolactone unit per one residue of an acrylate monomer is zero.

Comparative Example 5

80 parts of dipentaerythritol hexaacrylate ("M-400", trade name, produced by Toagosei Chemical Industries, Co., Ltd.), 20 parts of tetrahydrofurfuryl acrylate ("LIGHT-ACRYLATE THF-A", trade name, produced by Kyoeisha Chemical Co., Ltd.), 100 parts of toluene, and 4 parts of a photoinitiator ("IRGACURE 184") were mixed to prepare an actinic energy ray-curable composition having a solid content of 50% by weight.

Comparative Example 6

100 parts of acrylic polyol ("GAMERON 18-300", trade name, produced by Natoco Co., Ltd.) and an isocyanate curing agent ("GAMERON curing agent 18-001", trade name, produced by Natoco Co., Ltd.) were mixed to prepare a two-pack type acrylic urethane resin paint.

The compositions prepared in Examples 1 to 10 and Comparative Examples 1 to 6 were subjected to evaluation and measurement on each of the following items (1) to (14). The results thereof are shown in the following table 2.

(1) Paint Transparency

Each composition before curing was visually observed. Those where no turbidity was found were evaluated as ○ and those where turbidity was found were evaluated as x.

(2) Coated Film Transparency

On a surface of an easily-adhesive polyethylene terephthalate film having a thickness of 100 μm, a cured layer having a thickness of 10 μm made of each composition was provided to prepare a test plate. Using "TC-H3DPK" (trade name, produced by Tokyo Denshoku K.K.), transmittance (%) for all rays through each test plate was measured.

(3) Adhesiveness

Using each of the above-described test plates, a cross-cut peeling test was performed in accordance with JIS K5400. A test plate where a measured value was 0/100 was evaluated as ◎, a test plate where the measured value was from 1/100 to less than 5/100 was evaluated as ○, a test plate where the measured value was from 5/100 to less than 10/100 was evaluated as □, a test plate where the measured value was from 10/100 to less than 20/200 was evaluated as Δ, and a test plate where the measured value was 20/100 or more was evaluated as x.

(4) Moisture Resistance

A haze value of each test plate was measured before and after treatment where the above-described test plate was left under an atmosphere at 50° C. and at a relative humidity of 98% for 50 hours. A test plate where a value obtained by subtracting a haze value measured before the treatment from a haze value measured after the treatment was less than 5% was evaluated as ◎, a test plate where the value was from 5 to 10% was evaluated as ○, a test plate where the value was from 10 to 20% was evaluated as □, a test plate where the value was from 20 to 30% was evaluated as Δ, and a test plate where the value was 30% or more was evaluated as x.

(5) Solvent Resistance

Solvent resistance was evaluated by rubbing each of the test plates back and forth 10 times with a wiper ("KIM- WIPE", trade name, produced by Crecia Corporation) soaked with toluene. A test plate where no scratch or adhesion of fiber of the wiper was found was evaluated as ○, a test plate where scratch or adhesion of fiber of the wiper was slightly found was evaluated as Δ, and a test plate where scratch or adhesion of fiber of the wiper was remarkably found was evaluated as x.

(6) Scratch Resistance

Scratch resistance was evaluated by measuring a haze value (%) of each test plate rubbed back and forth 30 times at a load of 500 g using #0000 steel wool.

(7) Self-Repairing Ability

Self-repairing ability was evaluated by allowing test plates scratched with a nail to stand at room temperature for 30 minutes. A test plate where the scratch was repaired was evaluated as ○, and a test plate where the scratch was not repaired was evaluated as x.

(8) Workability

Workability was evaluated by cutting each of the test plates. A test plate having a cut face where no burr was generated was evaluated as ○, and a test plate having a cut face where a burr was generated was evaluated as x.

(9) Curling Property

Curling depth (mm) was measured by making a cross cut with a 2 cm square size in the center of a test plate cut into a size of 10 cm square.

(10) Flexure Resistance

Flexure resistance was evaluated by bending each of the test plates at 180 degrees by a vice such that one sheet of material with the same thickness as the test plate was caught in the test plate. A test plate having a cured layer where no damage such as crack or fracture was generated was evaluated as ○, and a test plate having a cured layer where damage such as crack or fracture was generated was evaluated as x.

(11) Acid Resistance

A haze value of each test plate was measured before and after the treatment where cotton wool impregnated with 0.1 N sulfuric acid was left on each of the test plates under an atmosphere at 25° C. for 24 hours. The test plate where a value obtained by subtracting a haze value measured before the treatment from a haze value measured after the treatment was less than 5% was evaluated as ◉, a test plate where the value was from 5 to 10% was evaluated as ○, a test plate where the value was from 10 to 20% was evaluated as □, a test plate where the value was from 20 to 30% was evaluated as Δ, and a test plate where the value was 30% or more was evaluated as x.

(12) Alkali Resistance

A haze value of each test plate was measured before and after the treatment where cotton wool impregnated with 0.1 N sodium hydroxide was left on each of the test plates under an atmosphere at 25° C. for 24 hours. A test plate where a value obtained by subtracting a haze value measured before the treatment from a haze value measured after the treatment was less than 5% was evaluated as ◉, a test plate where the value was from 5 to 10% was evaluated as ○, a test plate where the value was from 10 to 20% was evaluated as □, a test plate where the value was from 20 to 30% was evaluated as Δ, and a test plate where the value was 30% or more was evaluated as x.

(13) Productivity

Productivity was evaluated by time required to cure each composition coated on an easily-adhesive polyethylene terephthalate film during preparing each of the test plates. A test plate where the time required was less than 1 minute was evaluated as ○, and a test plate where the time required was 1 minute or more was evaluated as x.

(14) Scratch Test

A cured layer made of each of the compositions prepared in Examples 1 to 10 and Comparative Examples 1 to 6 was provided on the surface of an easily-adhered polyethylene terephthalate film having a thickness of 100 μm to prepare a test plate. The thickness of a cured layer made of the composition prepared in Comparative Example 5 was 20 μm, and the thickness of a cured layer other than this layer was 50 μm (this is because when the thickness of the cured layer made of the composition prepared in Comparative Example 5 exceeds 20 μm, the test plate was curled to generate fractures). The maximum scratch load (vertical load [mN]) where when a scratch mark was made on the cured layer of the test plate using a diamond indenter with a tip diameter of 15 μm, the scratch mark was capable of being repaired by self-repairing ability of the cured layer under an atmosphere at 25° C. and at a relative humidity of 50% was measured by means of a scratch tester produced by HEIDON Co. The unit of the measured value in parenthesis shown in Table 2 is gf.

TABLE 2

| | 1. Paint trans-parency | 2. Coated film trans-parency | 3. Adhe-siveness | 4. Moisture Resistance | 5. Solvent Resist-ance | 6. Scratch Resist-ance | 7. Self-repairing ability | 8. Work-ability | 9. Curling Prop-erty | 10. Flexure Resist-ance | 11. Acid Resist-ance | 12. Alkali Resist-ance | 13. Pro-duc-tivity | 14. Scratch Test |
|---|---|---|---|---|---|---|---|---|---|---|---|---|---|---|
| Ex. 1 | ○ | 90.1 | ◉ | ◉ | ○ | 1.9 | ○ | ○ | 0.4 | ○ | ◉ | ◉ | ○ | 392 (40) |
| Ex. 2 | ○ | 89.8 | ○ | ◉ | ○ | 1.2 | ○ | ○ | 0.5 | ○ | ◉ | ◉ | ○ | 657 (67) |
| Ex. 3 | ○ | 89.6 | ○ | ◉ | ○ | 1.6 | ○ | ○ | 0.6 | ○ | ◉ | ◉ | ○ | 412 (42) |
| Ex. 4 | ○ | 90.5 | ◉ | ◉ | ○ | 1.4 | ○ | ○ | 0.5 | ○ | ◉ | ◉ | ○ | 529 (54) |
| Ex. 5 | ○ | 90.0 | ◉ | ◉ | ○ | 1.9 | ○ | ○ | 0.5 | ○ | ◉ | ◉ | ○ | 235 (24) |
| Ex. 6 | ○ | 89.9 | ◉ | ◉ | ○ | 1.2 | ○ | ○ | 0.7 | ○ | ◉ | ◉ | ○ | 696 (71) |
| Ex. 7 | ○ | 90.4 | ○ | ◉ | ○ | 1.4 | ○ | ○ | 0.6 | ○ | ◉ | ◉ | ○ | 490 (50) |
| Ex. 8 | ○ | 90.2 | ◉ | ◉ | ○ | 1.3 | ○ | ○ | 0.5 | ○ | ◉ | ◉ | ○ | 353 (36) |
| Ex. 9 | X | 85.4 | ◉ | ◉ | ○ | 1.8 | ○ | ○ | 0.8 | ○ | ◉ | ◉ | ○ | 235 (24) |
| Ex. 10 | ○ | 90.6 | ○ | ○ | ○ | 1.6 | ○ | ○ | 0.9 | ○ | ◉ | ◉ | □ | 235 (24) |
| C. Ex. 1 | ○ | 90.0 | ○ | ◉ | ○ | 3.4 | ○ | ○ | 0.9 | ○ | ◉ | ◉ | ○ | 176 (18) |
| C. Ex. 2 | ○ | 90.7 | ○ | ◉ | ○ | 22 | X | ○ | 1.2 | ○ | ◉ | ◉ | ○ | 88 (9) |
| C. Ex. 3 | ○ | 89.8 | ◉ | ◉ | ○ | 27 | X | ○ | 0.7 | ○ | ◉ | ◉ | ○ | 78 (8) |
| C. Ex. 4 | ○ | 89.4 | ◉ | ◉ | ○ | 30 | X | ○ | 0.8 | ○ | ◉ | ◉ | ○ | 137 (14) |
| C. Ex. 5 | ○ | 90.5 | ○ | ◉ | ○ | 1.0 | X | X | 5.7 | X | ◉ | ◉ | ○ | 392 (40) |
| C. Ex. 6 | ○ | 90.5 | ◉ | ◉ | ○ | 8.8 | X | ○ | 0.6 | ○ | ◉ | ◉ | X | 118 (12) |

As shown in Table 2, Examples 1 to 10 were excellent in view of scratch resistance as compared with Comparative Examples 1 to 4 and Comparative Example 6, and had scratch resistance at the same level as Comparative Example 5 as a general hard coating agent. Further, with respect to the value of the critical load measured by the scratch test, all of Examples 1 to 10 were larger than Comparative Examples 1 to 4 and Comparative Example 6, and were the same level as Comparative Example 5. Further, there was such a tendency that Examples 1, 5, 7, 9 and 10 in which the maximum difference in the number of repetitions of the caprolactone unit per one residue of the acrylate monomer between two kinds of the urethane acrylates contained in the actinic energy ray-curable composition was out of the range of from 4 to 9 were slightly inferior to the other Examples in scratch resistance.

Example 11

Preparation of Light Reflective Film (1)

7 parts of barium sulfate and 3 parts of titanium dioxide were dispersed in 60 parts of a urethane polyester polyol resin ("BURNOCK D6-439", trade name, produced by Dainippon Ink & Chemicals, Inc.) to prepare a coating liquid. Onto a release treated face of a release treated polyester film ("DIAFOIL MRX", trade name, produced by Diafoil Hoechst Co., Ltd.) having a thickness of 75 μm, the coating liquid was coated to have a dry film thickness of 50 μm and cured to form a white resin layer. Next, 10 parts of titanium dioxide was dispersed in 50 parts of the actinic energy ray-curable composition in Example 1 to prepare a coating liquid. Onto the white resin layer, the coating liquid was coated to have a dry film thickness of 100 μm and cured to form a reflective resin layer.

Example 12

Preparation of Light Reflective Film (2)

Onto one side of a polyethylene terephthalate film ("LUMIRROR T-60", trade name, produced by Toray Industries, Inc.) having a thickness of 50 μm, the actinic energy ray-curable composition in Example 1 was coated to have a dry film thickness of 50 μm and cured to form a reflective resin layer. Next, 7 parts of barium sulfate and 3 parts of titanium dioxide were dispersed in 60 parts of a urethane polyester polyol resin ("BURNOCK D6-439") to prepare a coating liquid. Onto the reflective resin layer, the coating liquid was coated to have a dry film thickness of 100 μm and cured to form a white resin layer.

Example 13

Preparation of Antireflective Film (1)

Onto one side of a plasma-treated polyethylene terephthalate film having a thickness of 100 μm, the actinic energy ray-curable composition in Example 2 was coated to have a dry film thickness of 100 μm and cured to form a lower resin layer. Next, 0.3 parts of a photoinitiator ("IRGACURE 184") was blended in 100 parts of "OPSTAR JM5010" (trade name, produced by JSR Co., Ltd.) to prepare a coating liquid. Onto the lower resin layer, the coating liquid was coated by spin coating to have a dry film thickness of 0.1 μm and cured to form a layer having a low refractive index.

Example 14

Preparation of Antireflection Film (2)

Onto one side of a polycarbonate film having a thickness of 380 μm, the actinic energy ray-curable composition in Example 1 was coated to have a dry film thickness of 100 μm and cured to form a lower resin layer. Next, a coating liquid comprising 10 parts of dipentaerythritol hexaacrylate ("M-400"), 200 parts of a titanium dioxide-dispersed liquid (200 parts of a 15% toluene solution) and 0.3 parts of a photoinitiator ("IRGACURE 184") was prepared. Further, onto the lower resin layer, the coating liquid was coated by spin coating to have a dry film thickness of 0.1 μm and cured to form a layer having a high refractive index. Subsequently, 0.3 parts of a photoinitiator ("IRGACURE 184") was blended in 100 parts of OPSTAR JM5010 to prepare a coating liquid. Onto the layer having a high refractive index, the coating liquid was coated by spin coating and cured to form a layer having a low refractive index.

Example 15

Preparation of Polarizing Film (1)

Onto a triacetyl cellulose film ("FUJI TACK F-T-UV80", trade name, produced by Fuji Photo Film Co., Ltd.) having a thickness of 80 μm, the actinic energy ray-curable composition in Example 3 was coated to have a dry film thickness of 60 μm and cured.

Example 16

Preparation of Polarizing Film (2)

10 parts of ultrafine particles ZnO was dispersed in 90 parts of the actinic energy ray-curable composition in Example 3 to prepare a coating liquid. Onto an existing polarizing plate consisting of a three-layered structure of a triacetyl cellulose film, polarizing element and a triacetyl cellulose film, the coating liquid was coated and cured.

Example 17

Preparation of Light-Diffusing Film (1)

35 parts of beads ("GM-0630H", trade name, produced by Ganz Chemical Co., Ltd.) made of polymethyl methacrylate was dispersed in 100 parts of the actinic energy ray-curable composition in Example 4 to prepare a coating liquid. Onto a polyethylene terephthalate film ("Lumirror T-60") having a thickness of 50 μm, the coating liquid was coated to have a dry film thickness of 15 μm and cured.

Example 18

Preparation of Light-Diffusing Film (2)

Onto an existing light-diffusing film, the actinic energy ray-curable composition in Example 4 was coated and cured.

Example 19

Preparation of Phase Contrast Film

Onto a film prepared by uni-axially stretching a polycarbonate film having a thickness of 100 μm up to from 1.15 to 1.25 times, the actinic energy ray-curable composition in Example 6 was coated and cured.

Example 20

Preparation of Film for a Touch Sensor (an Upper Top Film of a Touch Sensor)

Onto a polyethylene terephthalate film having a thickness of 188 μm ("A4100", trade name, produced by Toyobo Co., Ltd.), the actinic energy ray-curable composition in Example 7 was coated to have a dry film thickness of 60 μm and cured.

Any of the above-described functional members in Examples 11 to 20 have excellent scratch resistance.

INDUSTRIAL APPLICABILITY

The actinic energy ray-curable composition of the present invention is useful as paints or coating agents for products where scratch resistance is required.

What is claimed is:

1. An actinic energy ray-curable composition comprising a urethane (meth)acrylate obtained by reacting an organic isocyanate having a plurality of isocyanate groups in one molecule with a polycaprolactone-modified alkyl (meth)acrylate and a long-chain alcohol, wherein said urethane (meth)acrylate contains two or more urethane (meth)acrylates different from one another in the number of repetitions of a caprolactone unit per one residue of the polycaprolactone-modified alkyl (meth)acrylate, and wherein the long-chain alcohol is selected from the group consisting of tridecanol, myristyl alcohol, cetyl alcohol, stearyl alcohol, behenyl alcohol, and polyoxyethylene monostearate.

2. The actinic energy ray-curable composition according to claim 1, wherein a maximum in difference in the number of repetitions of the caprolactone unit per one residue of said polycaprolactone-modified alkyl (meth)acrylate between two of the urethane (meth)acrylates is 9 or less.

3. An actinic energy ray-curable composition comprising:
a urethane (meth)acrylate obtained by reacting an organic isocyanate having a plurality of isocyanate groups in one molecule with two or more polycaprolactone-modified alkyl (meth)acrylates different from one another in the number of repetitions of a caprolactone unit per one molecule, wherein a maximum in difference in the number of repetitions of the caprolactone unit between two of the polycaprolactone-modified alkyl (meth)acrylates is between 4 and 9 inclusive; and
a urethane (meth)acrylate obtained by reacting an organic isocyanate having a plurality of isocyanate groups in one molecule with a polycaprolactone-modified alkyl (meth)acrylate and a long-chain alcohol, wherein the long-chain alcohol is selected from the group consisting of tridecanol, myristyl alcohol, cetyl alcohol, stearyl alcohol, behenyl alcohol, and polyoxyethylene monostearate.

4. The actinic energy ray-curable composition according to claim 3, wherein the average of the number of repetitions of the caprolactone unit per one molecule of said polycaprolactone-modified alkyl (meth)acrylate is from 1 to 5.

5. The actinic energy ray-curable composition according to claim 4, wherein the average of the number of repetitions of the caprolactone unit per one molecule of said polycaprolactone-modified alkyl (meth)acrylate is from 1 to 2.5.

6. An actinic energy ray-curable composition comprising a urethane (meth)acrylate obtained by reacting an organic isocyanate having a plurality of isocyanate groups in one molecule with two or more polycaprolactone-modified alkyl (meth)acrylates different from one another in the number of repetitions of a caprolactone unit per one molecule and a long-chain alcohol, wherein a maximum in difference in the number of repetitions of the carprolactone unit between two of the polycaprolactone-modified alkyl (meth)acrylates is between 4 and 9 inclusive, and wherein the long-chain alcohol is selected from the group consisting of tridecanol, myristyl alcohol, cetyl alcohol, stearyl alcohol, behenyl alcohol, and polyoxyethylene monostearate.

7. The actinic energy ray-curable composition according to claim 6, wherein an average of the number of repetitions of the caprolactone unit per one molecule of said polycaprolactone-modified alkyl (meth)acrylate is from 1 to 5.

8. The actinic energy ray-curable composition according to claim 7, wherein an average of the number of repetitions of the caprolactone unit per one molecule of said polycaprolactone-modified alkyl (meth)acrylate is from 1 to 2.5.

9. The actinic energy ray-curable composition according to claim 6, wherein the maximum in difference in the number of repetitions of the caprolactone unit between two of the polycaprolactone-modified alkyl (meth)acrylates is 9 or less.

* * * * *